United States Patent
Lee et al.

(10) Patent No.: US 7,324,448 B2
(45) Date of Patent: Jan. 29, 2008

(54) METHOD FOR CLASSIFYING SERVICE CLASSES OF PACKET DATA IN TWO WAY COMMUNICATION NETWORK

(75) Inventors: Sung-Won Lee, Songnam-shi (KR); Jae-Woo So, Taejon-Kwangyokshi (KR); Sun-Ho Lee, Taejon-Kwangyoksi (KR); Hye-Jeong Lee, Taejon-Kwangyoksi (KR); Dong-Ho Cho, Taejon-Kwangyoksi (KR)

(73) Assignee: Samsung Electronics Co., Ltd. (KR)

( * ) Notice: Subject to any disclaimer, the term of this patent is extended or adjusted under 35 U.S.C. 154(b) by 1104 days.

(21) Appl. No.: 09/996,553

(22) Filed: Nov. 28, 2001

(65) Prior Publication Data

US 2003/0099205 A1 May 29, 2003

(51) Int. Cl.
*H04L 12/26* (2006.01)
(52) U.S. Cl. .................. 370/232; 370/235; 370/229
(58) Field of Classification Search ........... 370/230, 370/230.1, 232, 233, 234, 235
See application file for complete search history.

(56) References Cited

U.S. PATENT DOCUMENTS

| | | | | |
|---|---|---|---|---|
| 6,023,456 A * | 2/2000 | Chapman et al. | ........... | 370/252 |
| 6,188,698 B1 * | 2/2001 | Galand et al. | ............. | 370/412 |
| 6,381,649 B1 * | 4/2002 | Carlson | .................. | 709/235 |
| 6,546,017 B1 * | 4/2003 | Khaunte | .................. | 370/412 |
| 6,571,101 B1 * | 5/2003 | Schulz | ..................... | 455/450 |
| 6,600,759 B1 * | 7/2003 | Wood | ....................... | 370/516 |
| 6,741,556 B1 * | 5/2004 | Seddigh et al. | ............ | 370/229 |
| 6,901,052 B2 * | 5/2005 | Buskirk et al. | ............ | 370/235 |
| 6,917,588 B1 * | 7/2005 | Cao et al. | ............... | 370/230.1 |
| 7,120,122 B1 * | 10/2006 | Starr et al. | .................. | 370/250 |
| 2004/0013089 A1 * | 1/2004 | Taneja et al. | .............. | 370/235 |
| 2005/0044206 A1 * | 2/2005 | Johansson et al. | ......... | 709/224 |

* cited by examiner

*Primary Examiner*—Nguyen Ngo
(74) *Attorney, Agent, or Firm*—The Farrell Law Firm, P.C.

(57) ABSTRACT

A method classifying service classes of packet data through an algorithm using several parameters is disclosed, in order to control the order of data transmission in a two-way communication network which supports various data transmissions having different kinds of quality of service (QoS).

17 Claims, 9 Drawing Sheets

METHOD FOR CLASSIFYING SERVICE CLASSES OF PACKET DATA IN TWO WAY COMMUNICATION NETWORK

BACKGROUND OF THE INVENTION

1. Field of the Invention

The present invention relates generally to the control of the order of data transmission in a two-way communication network which supports various data transmissions having different kinds of quality of service (QoS). More particularly, the present invention is directed to a method for classifying service classes of packet data through an algorithm using several parameters.

2. Description of the Related Art

Modern two-way communication networks that provide for the transmission packet of data have become more and more important because these kinds of networks can make more efficient use of communication resources than conventional communication systems, such as the public switched telephone network (PSTN). For example, the delivery of telephone calls over a two-way network providing for-the transmission packet of data, has become popular due to potential cost savings. In addition, packet data transmission can allow different networks to connect easily to each other through an adapter such as a gateway. As the use of the Internet has dramatically grown, the demand for high speed data transmission has increased so fast that a method to be able to accommodate different networks is needed. In addition, a need exists for a technology to classify service classes provided by a plurality of data networks, such as a computer network, telephone network, or asynchronous transfer mode (ATM) network.

However, conventional two-way communication networks are not designed to classify service classes of packet data. Therefore, each data packet generated from different data sources is processed by using a pure first-in-first-out (FIFO) method at a node that connects the plurality of networks.

Figure 1:
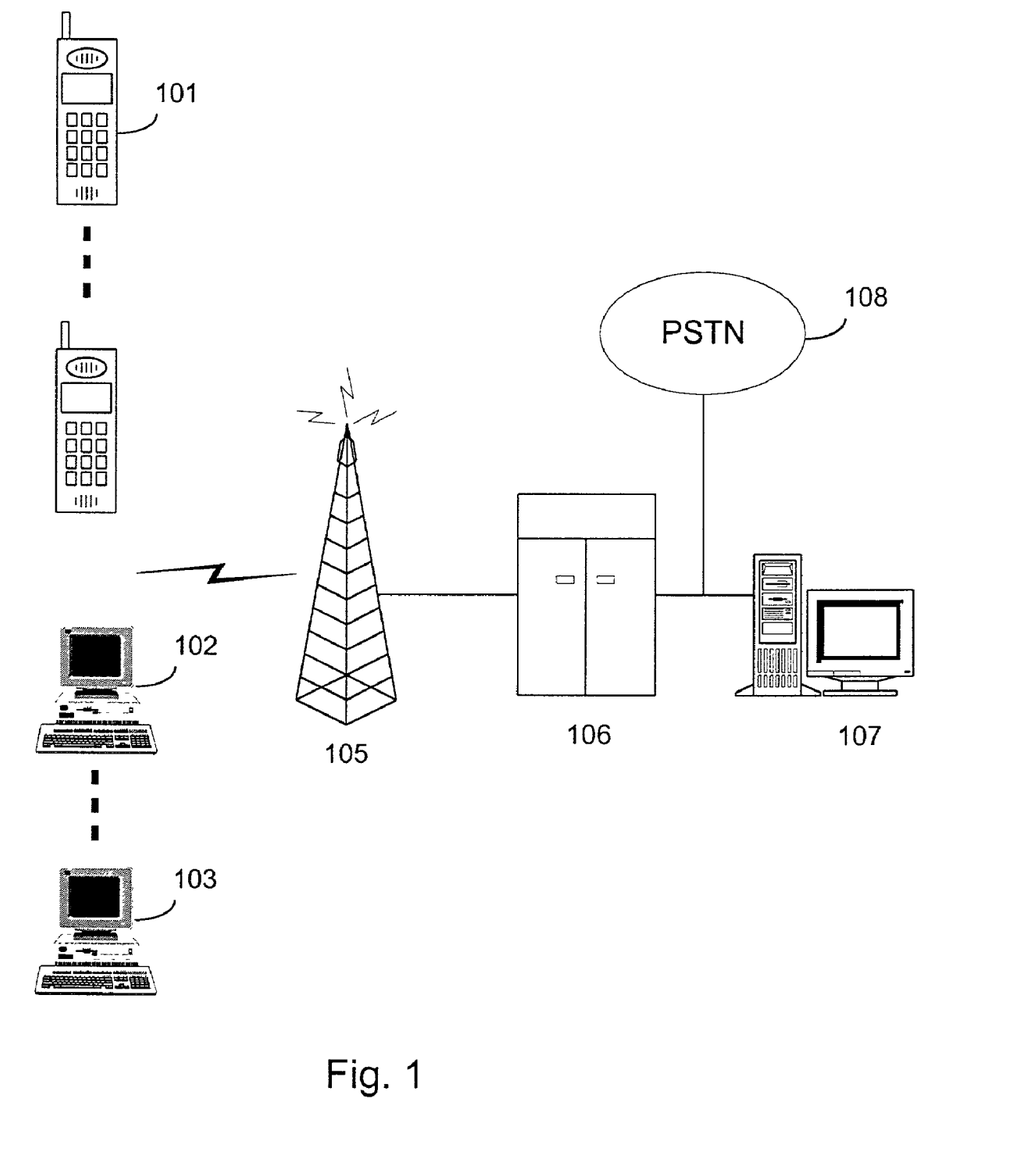
FIG. 1 illustrates a schematic diagram of a two-way communication network.

A conventional mobile wireless two-way communication network is shown in FIG. 1. Some terminals, such as cellular phone 101, generate real-time packet data corresponding to a voice or video data stream that is time-sensitive, while internet protocol (IP) terminal 102 or personal digital assistant (PDA) 103 generate non-real time packet data that is less time sensitive than a real-time data stream.

Referring to FIG. 1, packet data generated by each terminal 101, 102 and 103 is transmitted to a Base Station Controller (BSC) 106 through a Base Transceiver System (BTS) 105 where each data packet is multiplexed in a FIFO method, and then delivered to the computer network 107 (i.e. the Internet) or public switch telephone network 108 (PSTN) through a router (not shown) that is located in the BTS or BSC. However, a two-way communication network using the FIFO method can cause serious problems such as the late arrival of the data at a destination if the transmission of real-time packet data, such as audio, video, telemetry or control signals, is affected by the congestion of traffic. Furthermore, if the two-way communication network allows for the use of variable packet sizes to transmit or receive the packet data stream, the transmission of real time packet data is more seriously affected.

Presently, there is no way to discriminate whether packet data corresponds to a real time packet data stream or a non-real time packet data stream in conventional two-way communication networks providing for packet data transmission. As a result, the conventional networks are not designed to efficiently handle real time packet stream transmission.

SUMMARY OF THE INVENTION

It is therefore an object of the present invention to provide a method for efficiently transmitting packet data through a two-way communication network, particularly a mobile communication network and a computer network.

It is another object of the present invention to provide a method for classifying service classes for transmission of packet data in a two-way communication network.

It is still another object of the present invention to provide an algorithm to classify service classes for transmission of packet data in a two-way communication network.

It is still another object of the present invention to a method for classifying packet data as a real time data stream or a non-real time data stream in a two-way communication network.

According to an aspect of the present invention, there is provided a method for classifying a service class for transmission of packet data in a two-way communication network which supports transmission of packet data having various quality of service (QoS), comprising the steps of:
  determining a first parameter associated with a bi-directional full-duplex two-way communication characteristic of packet data transmission;
  determining a second parameter associated with a traffic characteristic of packet data transmission; and
  calculating a value to classify the service class of the packet data by using the first and second parameters.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described in detail herein below with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 6:
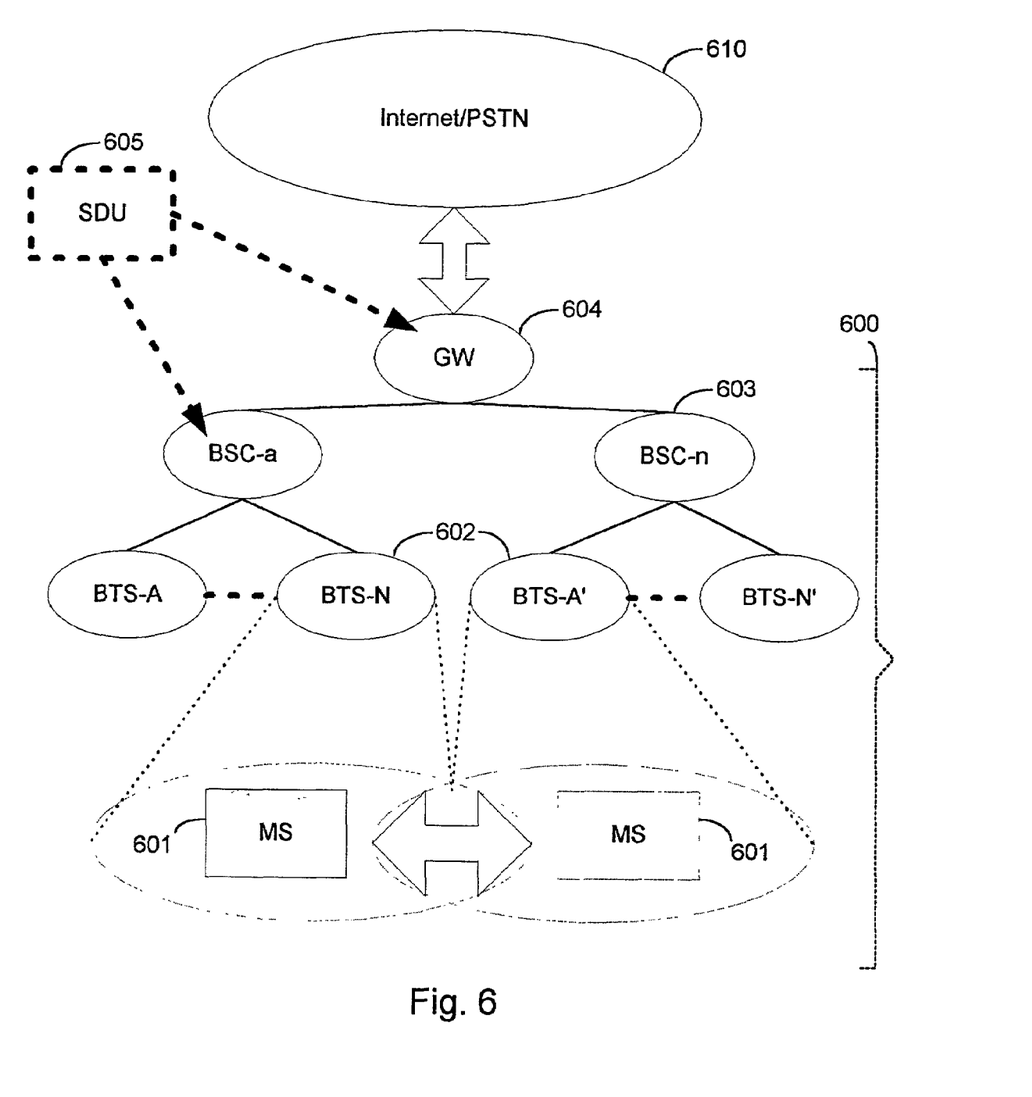
FIG. 6 illustrates a block diagram of a two-way mobile communication network.

FIG. 6 illustrates a block diagram of a two-way mobile communication network. As will be discussed in more detail, exemplary network 600 includes a plurality of mobile terminals 601 for generating real time, near-real time, or non-real time packet data and for transmitting packet data through base transceiver system (BTS) 602 that manages the radio resources. The exemplary network 600 also includes base station controller (BSC) 603 which controls each BTS 602, and gateway (GW) 604 that supports transfer of protocol between different networks, and is connected between mobile communication network 600 and a computer network (i.e. the Internet) or public switch telephone network (PSTN) 610. The exemplary network 600 also includes selection and distribution unit (SDU) 605 for synchronizing data streams received from a plurality of links, and for then transmitting the synchronized data streams to an upper level (i.e. GW 604). The SDU 605 is usually located at BSC 603 or GW 604.

Figure 7:
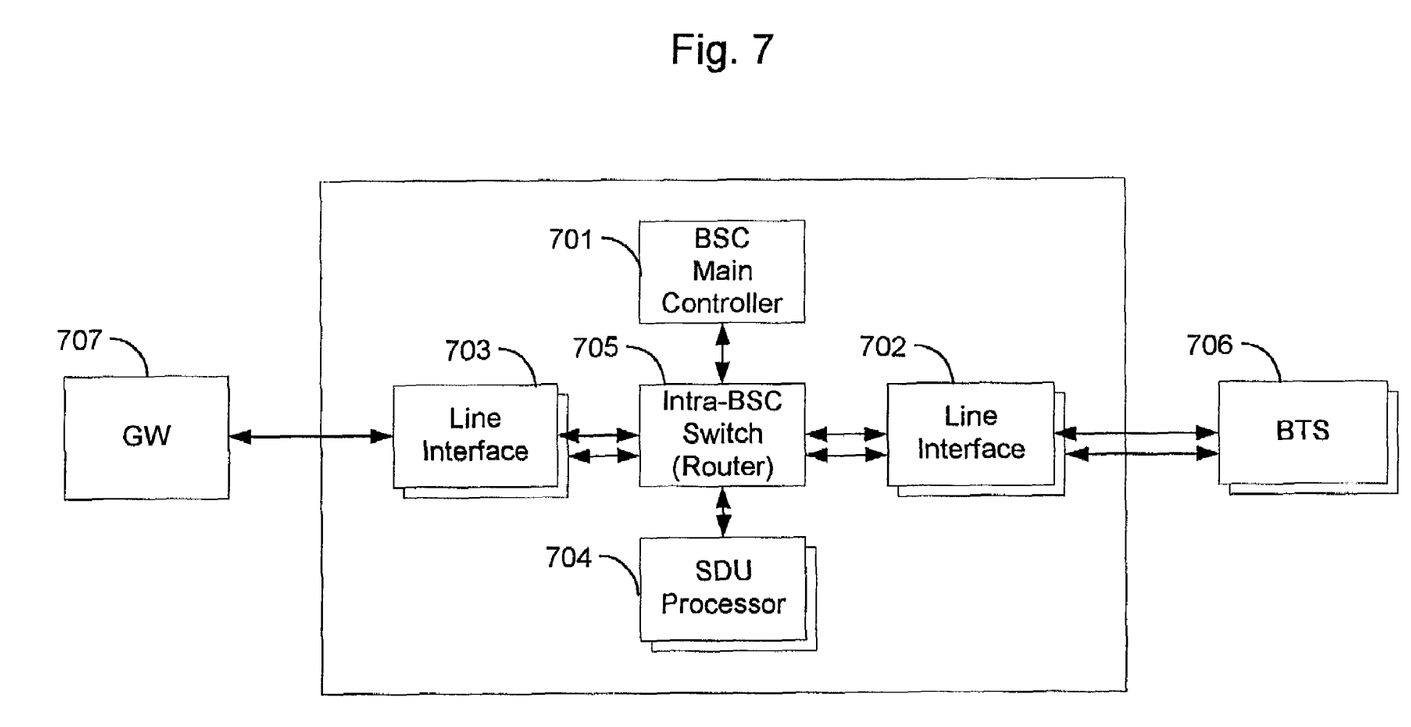
FIG. 7 illustrates a structure of a Base Station Controller (BSC) which incorporates a selection and distribution unit (SDU) according to the present invention.

FIG. 7 illustrates a structure of a BSC incorporating a preferred exemplary embodiment of the present invention. As shown in FIG. 7, base station controller (BSC) 700 includes line interfaces 702, 703 to connect BTS 706 to GW 707, and BSC main controller 701 that controls the overall operation of BSC 700. Intra-BSC switch 705 is provided for routing packet data traffic, and SDU 704 is provided for multiplexing or de-multiplexing packet data transmitted or received from at least two links.

Figure 8:
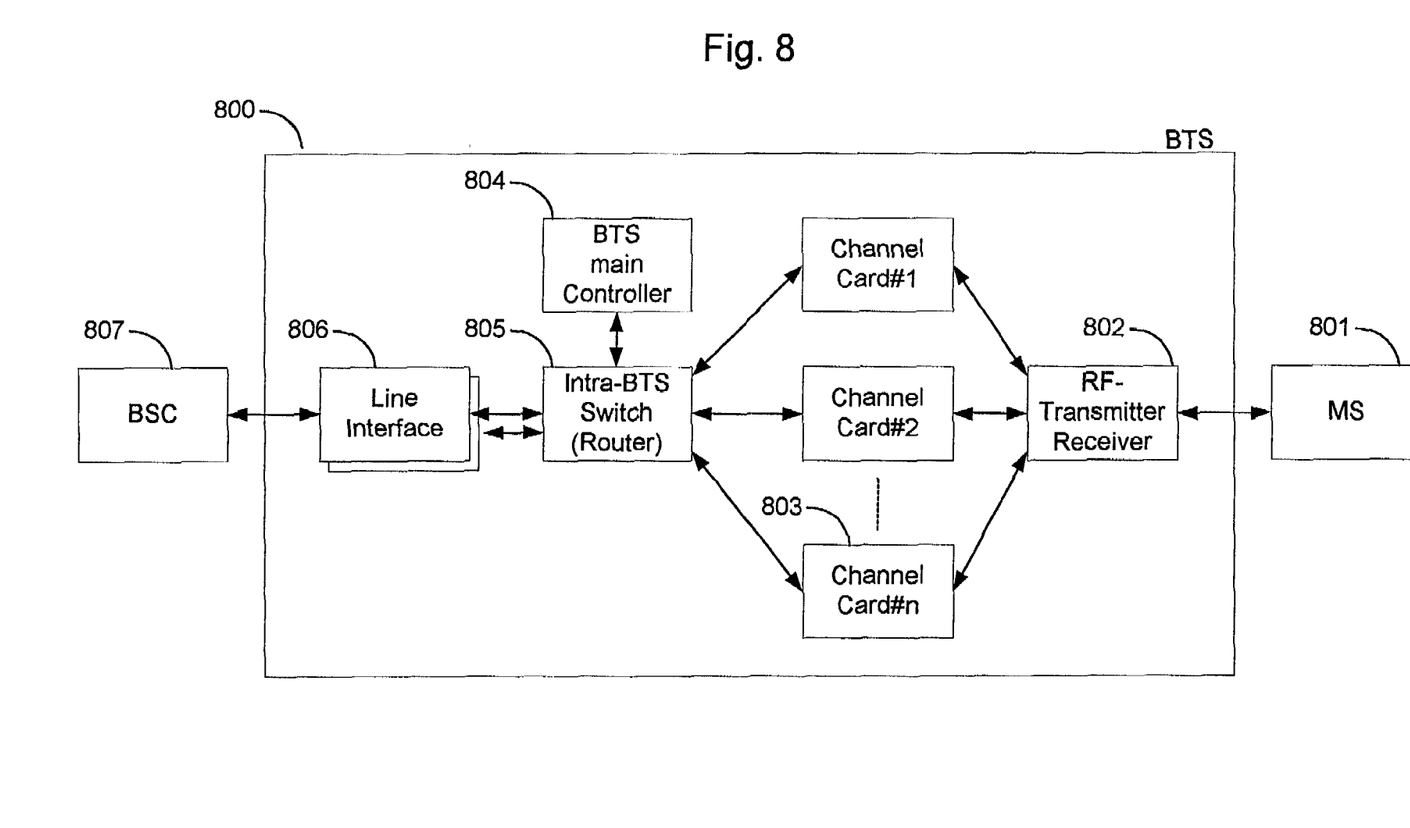
FIG. 8 illustrates a structure of a Base Transceiver System (BTS) according to the present invention.

FIG. 8 illustrates a structure of a BTS incorporating a preferred exemplary embodiment of the present invention. Referring to FIG. 8, BTS 800 includes line interface 806 for connecting BTS 800 to BSC 807, RF transmitter/receiver 802 for communicating with mobile station (MS) 801, BTS main controller 804 that controls the entire operation of BTS 800, Intra-BTS switch 805 for determining the paths of traffic, and a plurality of channel cards 803 located between the Intra-BTS switch 805 and the RF transmitter/receiver 802.

Figure 9:
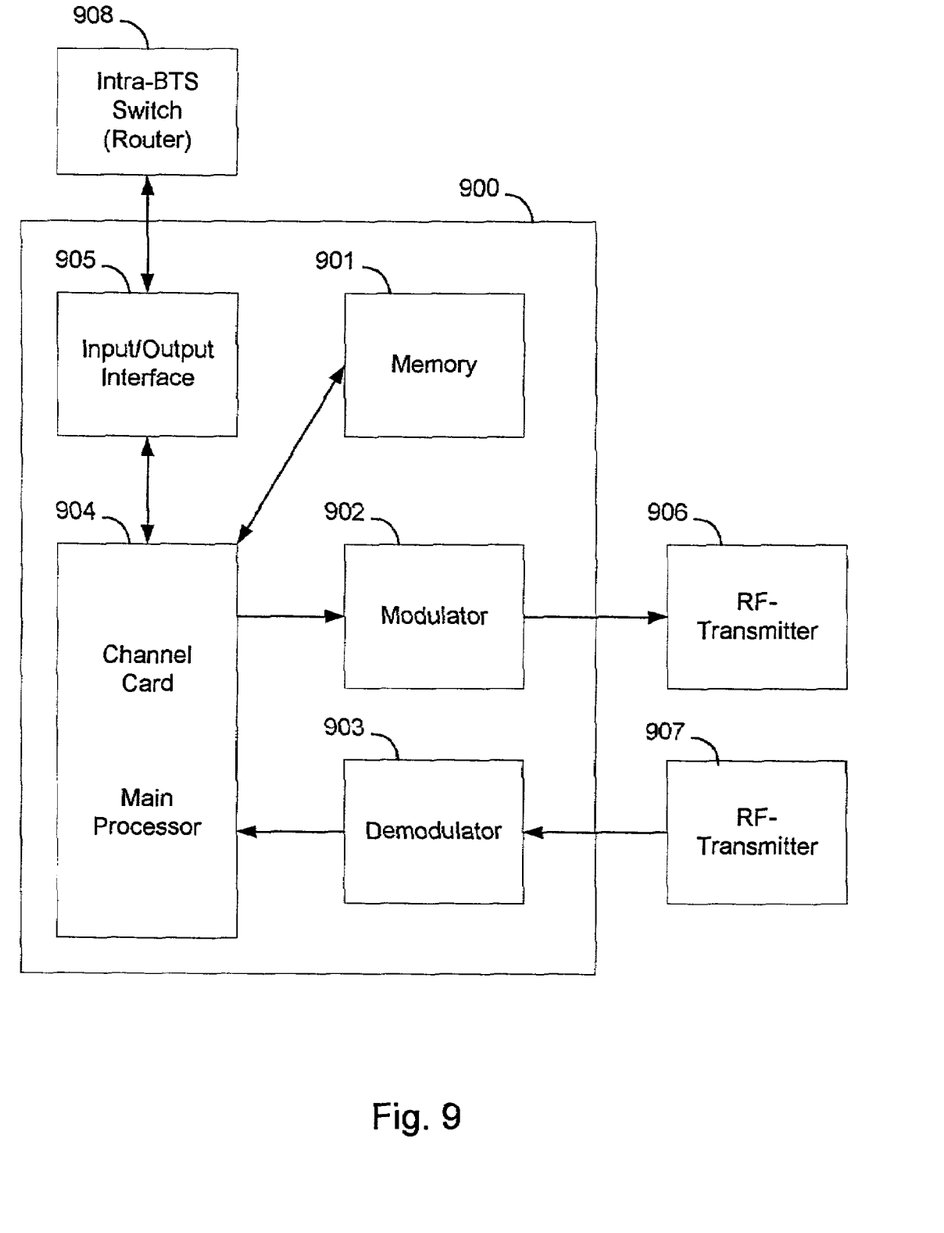
FIG. 9 illustrates a structure of a channel card according to the present invention.

With reference to FIG. 9, the structure of the channel card 803 of FIG. 8 is described in detail. The channel card 900 includes an input/output interface 905 that communicates with Intra-BTS switch 908, main processor 904, memory 901, and modulator 902/demodulator 903 for interfacing with RF transmitter 906 and RF receiver 907 respectively.

Figure 2:
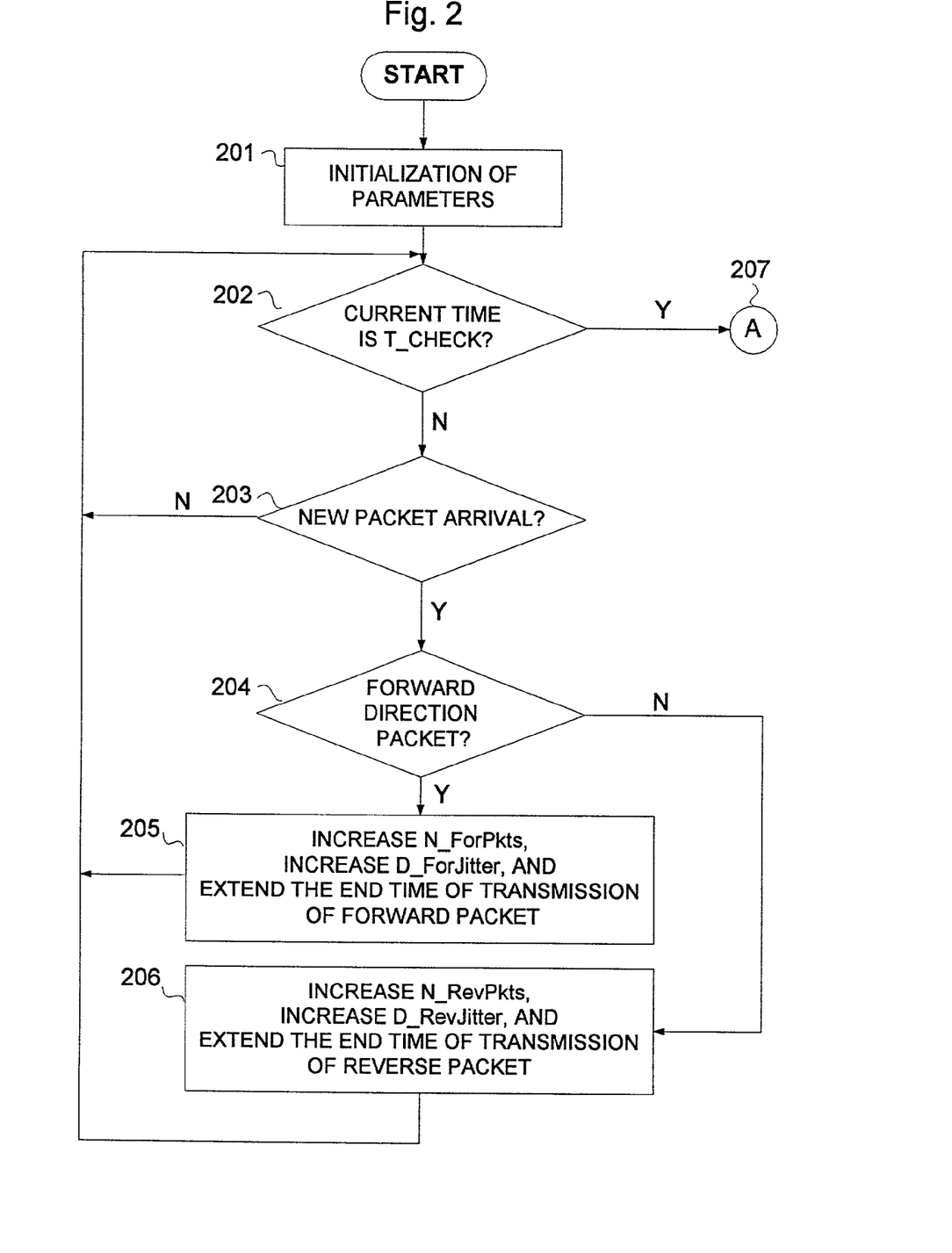
FIG. 2 illustrates a flow chart of the process for entering a classification of service class mode for the transmission of packet data according to the present invention.

Referring back now to FIG. 2. FIG. 2 is a flow chart illustrating a process for entering classification of service class mode for the transmission of the packet data according to the present invention. In FIGS. 2 to 5, the following abbreviations of each parameter is set forth as follows:

w_NEW: a weighted value associated with a current class of service;
w_OLD: a weighted value associated with a previous class of service;
T_Check: a period of time for classifying service classes of packet data following the current packet data;
T_PrevForTxEnd: the end time of transmission of previous forward direction packet data;
T_PrevRevTxEnd: the end time of transmission of previous reverse direction packet data;
T_CheckInterval: a period of time for classifying service classes of packet data;
T_PktArrival: the arrival time of packet data;
T_PktTxTime: the time needed to transmit packet data;
N_ForPkts: the number of packet data being served over the forward link for the T_CheckInterval;
N_RevPkts: the number of packet data being served over the reverse link for the T_CheckInterval;
D_ForJitter: the amount of packet jitter being served over the forward link for the T_CheckInterval; and
D_RevJitter: the amount of packet jitter being served over the reverse link for the T_CheckInterval.

Figure 3:
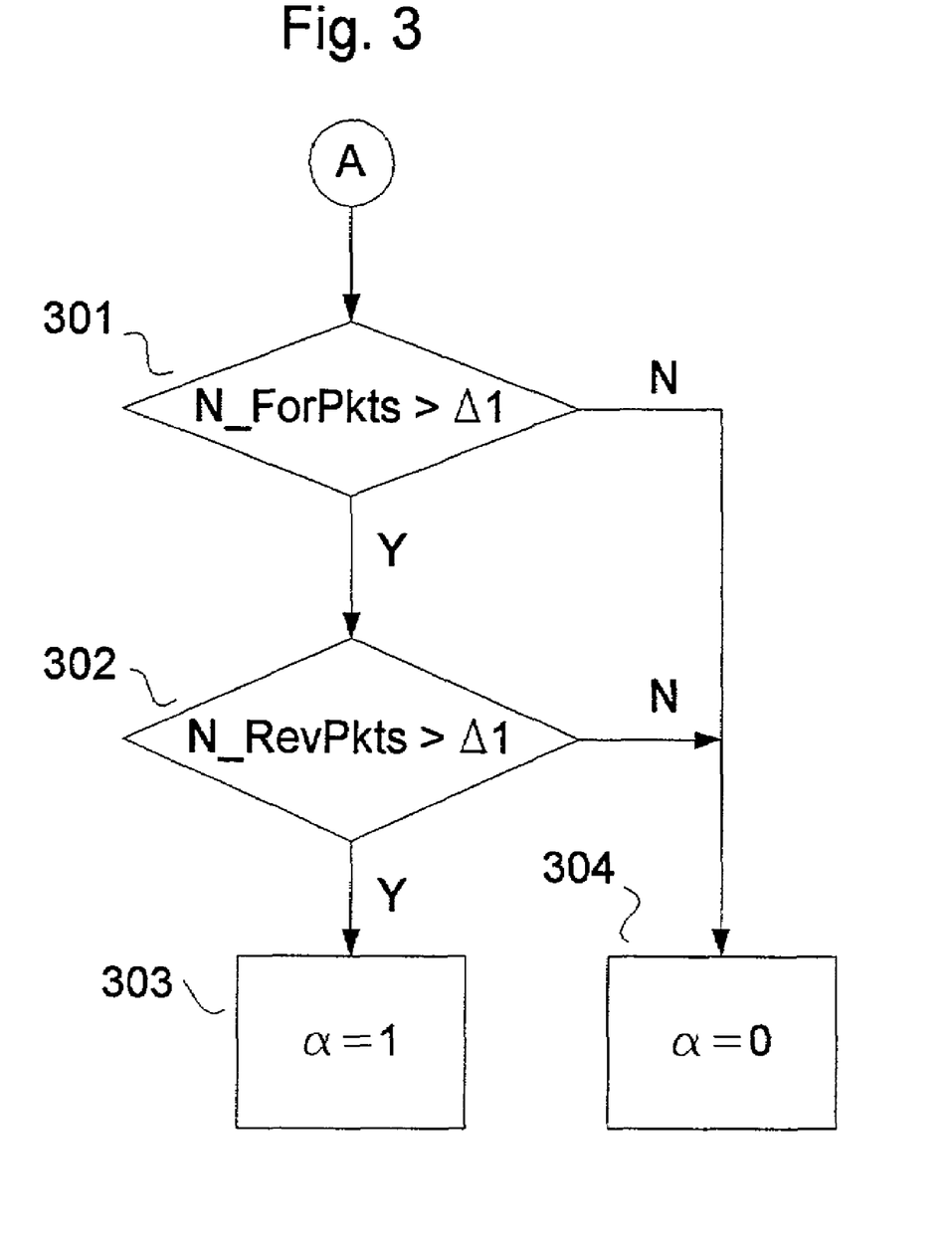
FIG. 3 illustrates a flow chart showing a method for classifying service classes for transmission of the packet data according to the present invention.
Figure 4:
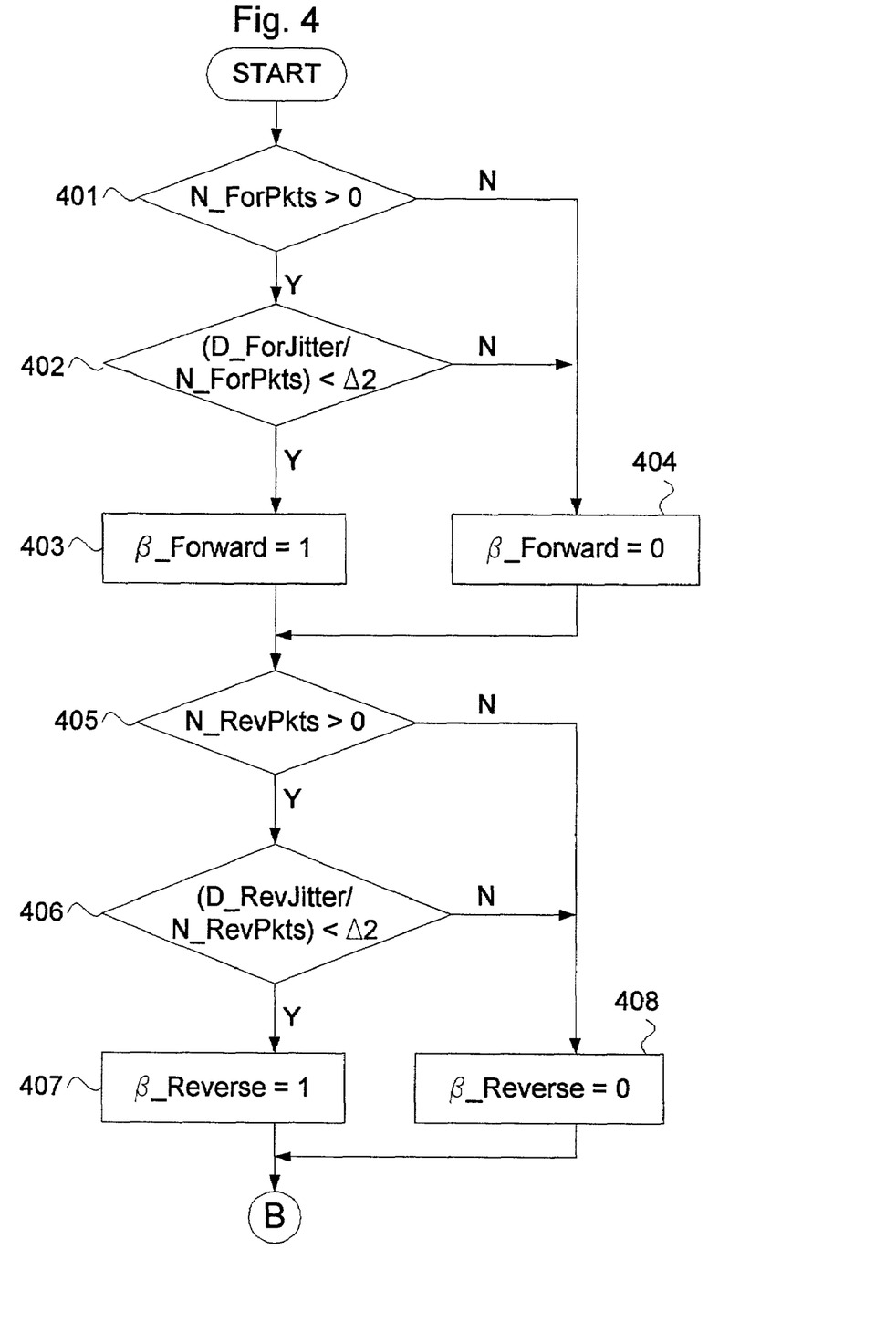
FIG. 4 illustrates a flow chart showing another method for classifying service classes for the transmission of the packet data according to the present invention.

Now, the process of FIG. 2 will be explained in detail. Referring to FIG. 2, main processor 904 of channel card 900 in FIG. 9 initializes all the parameters in step 201 when there is a need to classify the service class. The main processor 904 checks if the current time of the communication system corresponds to the period of time for classifying service classes (T_Check) in step 202. If the current time matches T_Check, the algorithm for classifying service classes, which is stored in the memory 901 of the channel card 900 of FIG. 9, is implemented in step 207(FIGS. 3 and 4). Otherwise, the main processor 904 checks if a new data packet transmitted over the forward or reverse link is detected in step 203. If a new data packet is detected in step 203, the main processor 904 determines whether the newly detected data packet has been transmitted over the forward link or not in step 204. If the newly detected data packet was transmitted over the forward link, the main processor 904 increase the parameters N_ForPkts, D_ForJitter and T_PrevForTxEnd in step 205, in accordance with Equation 1:

$$N\_ForPkts=N\_ForPkts+1; \qquad \text{(Equation 1.)}$$

$$D\_ForJitter=D\_ForJitter+(T\_PktArrival-T\_PrevForTxEnd);$$

$$T\_PrevForTxEnd=T\_PktArrival+T\_PktTxTime;$$

However, if it is determined in step 204 that the newly detected data packet was transmitted over the reverse link, the main processor 904 increase the parameters N_RevPkts, D_RevJitter and T_PrevRevTxEnd in step 206, in accordance with Equation 2:

$$N\_RevPkts=N\_RevPkts+1;$$

$$D\_RevJitter=D\_RevJitter+(T\_PktArrival-T\_PrevRevTxEnd);$$

$$T\_PrevRevTxEnd=T\_PktArrival+T\_PktTxTime;$$

Figure 5:
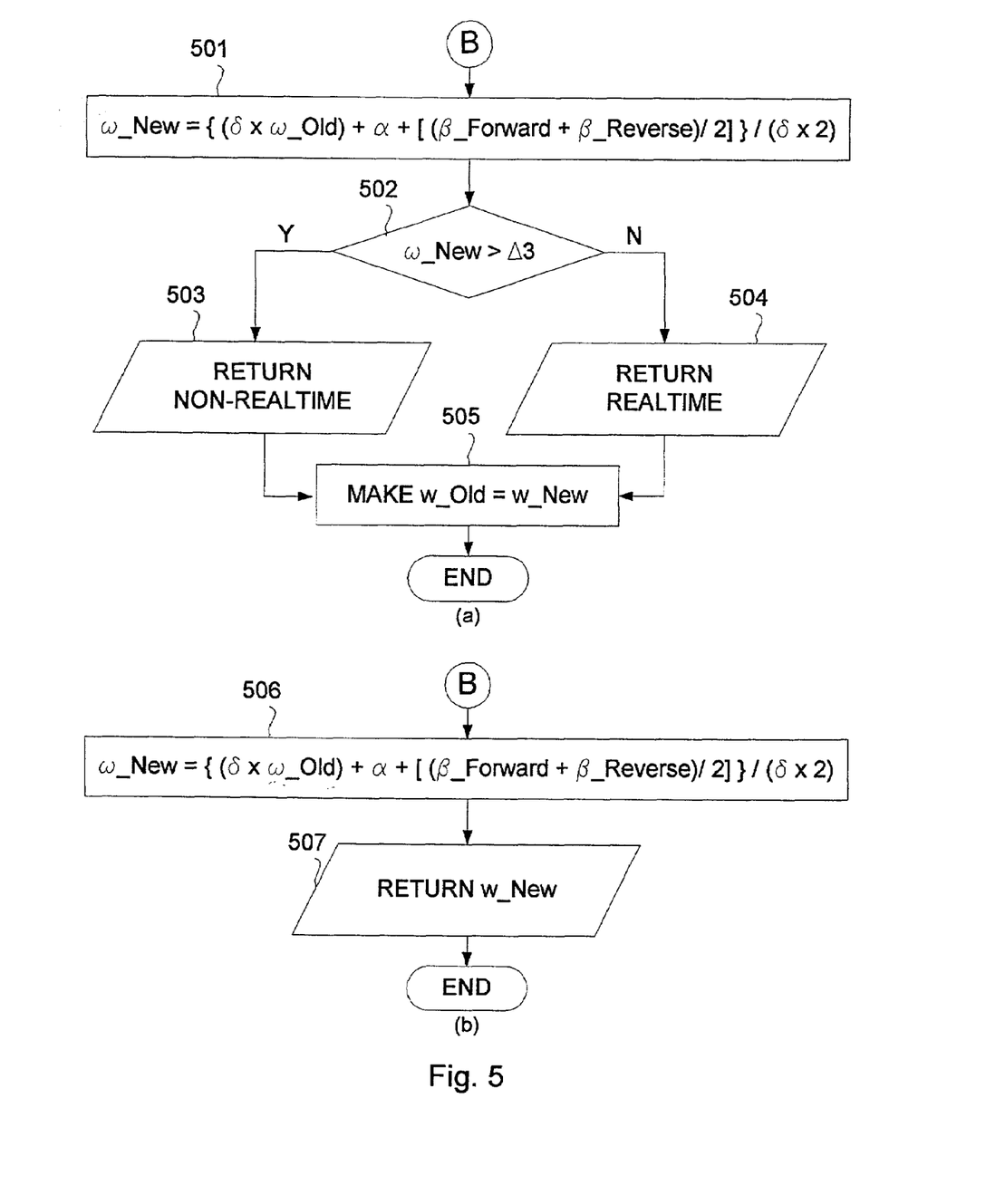
FIGS. 5a and 5b illustrate a flow chart showing a third method for classifying service classes for transmission of the packet data according to the present invention.

The algorithm for classifying service classes of packet data will be explained in detail with reference to FIGS. 3, 4 and 5, respectively. First, notations used in algorithm are set forth as follows:

$\propto$ (duplex activity factor): a parameter associated with the two way communication characteristic $\beta$ (frequency factor): a parameter associated with the traffic characteristic of packet data corresponding to how often the data packet is being served. There are two kinds of parameters. One is $\beta$_forward related to the forward channel. The other is $\beta$_reverse related to reverse channel.

$\Delta 1$: a threshold value for determining $\propto$ (the duplex activity factor) on the basis of the number of packet data detected over the forward or reverse channel for T_CheckInterval.

$\Delta 2$: a threshold value for determining $\beta$ (the frequency factor) on the basis of the frequency of the data transmission over the forward or reverse channel for T_CheckInterval.

$\Delta 3$: a threshold value for classifying service classes of packet data.

1) Determination of ∝(Duplex Activity Factor)

FIG. 3 illustrates the procedure of determination of duplex activity factor(∝) that will be described in detail. Referring to FIG. 2, at step 202 if the current time of communication network corresponds to T_Check, the main processor 904 measures the number of packet data being served over the forward link for the latest T_CheckInterval, namely N_ForPkts, and determining whether or not the measured N_ForPkts is larger than a threshold value Δ1 in step 301. The number of packet data being served over the reverse link for the latest T_CheckInterval, N_RevPkts, is also measured by using the same method as described above in step 301. In either parameter if at least one parameter is smaller than the threshold value Δ1, ∝ (duplex activity factor) is set to 0 in step 304. Otherwise, it is set to 1 in step 303.

Herein, if the duplex activity factor (∝) is 1, the packet data being served is classified as symmetric service corresponding to real time data, for example telephone or video demand communication. If the duplex activity factor, (∝), however, is 0, the packet data is classified as asymmetric service. One example of asymmetric service is transmitting over the Internet through a computer network.

2) Determination of β (Frequency Factor)

With reference to FIG. 4, the procedure of determination of the Frequency factor (β) will be described in detail.

Referring to FIG. 2, at step 202 if the current time of communication network corresponds to T_Check, the main processor 904 detects if any packet data is transmitted over the forward channel, and measures a parameter (N_ForPkts), which is the number of packet data being served over the forward link for the T_CheckInterval in step 401. If the N_ForPkts is larger than 0, in step 402, the main processor 904 divides the parameter value D_ForJitter, which is the number of packet jitter being served over the forward link for the T_CheckInterval, by the parameter N_ForPkts measured in step 401, and determines whether or not the divided value is larger than a threshold value Δ2. In either step 401 or 402, if there is no detected packet data transmitted over the forward channel, or the division value is larger than the threshold value Δ2, β_forward set to 0 in step 404. Otherwise, it is set to 1 in step 403.

A parameter, β_reverse, will also be obtained the same way as deciding the parameter, β_forward, in accordance with steps 405, 406, 407 and 408 of FIG. 4.

Frequency factor (β) is a parameter that sets forth how frequently packet data is detected over a channel for a predetermined period of time.

3) Classification of Service Classes of Packet Data

FIG. 5a illustrates the procedures for classifying service classes of packet data as real time or non-real time data.

Once the two parameters, ∝ (duplex activity factor) and β (frequency factor), have been obtained as set forth in FIGS. 3 and 4, the main processor 904 calculates a value of parameter, w_NEW, by using the following mathematical equation in step 501.

$$w\_NEW = \{(\delta \times w\_OLD) + \propto + [(\beta\_forward + \beta\_Reverse)/2]\}/(\delta \times 2) \quad (EQ. 1)$$

Herein, parameter δ represents a weight factor of w_OLD and may be chosen from any real number between 0 and 1.

In step 502, if the value of parameter w_NEW is larger than the threshold value Δ3, the main processor determines the service class of packet data being served as a non-real time data stream in step 503. Otherwise the service class of packet data being served is treated as real time data stream in step 503. After determining the service class of packet data being served, the main processor 904 substitutes the value of parameter, w_OLD, for the value of parameter, w_NEW, in step 505.

FIG. 5b shows another algorithm to classify the service class of packet data being served as several classes, including near-real time. In FIG. 5b, after obtaining a value of the parameter, w_NEW, in step 506 according to EQ. 1, the main processor 904 classifies the service class of packet data on the basis of the obtained value of the parameter in step 506, and substitutes the value of parameter w_OLD for the value of parameter w_NEW in step 507.

Although the algorithm for classifying service classes of packet data is described with the method of using two parameters, ∝ (duplex activity factor) and β (frequency factor), it is possible to implement this invention with only using either the duplex activity factor (∝) or the frequency factor (β). In other words, the classification procedure of this invention can be performed by setting either parameter to zero. Therefore, communication operators can easily choose one of three algorithms to operate their network efficiently.

Particularly, the exemplary embodiment of the present invention describes a method for classifying service classes of packet data being served into a real time data stream or a non-real time data stream. Nevertheless, the service class of packet data can be grouped in more than two classes by using several real numbers instead of the use of 1 and 0.

The result of tests showing the advantage of the embodiment of present invention will be clear from the following tables below. The test has been implemented under the condition where there are 6 voice mobile terminals, and 20 data mobile terminals. In addition, voice traffic is assumed as an ON_OFF model, whose average time of duration of ON is 1 second, and average time of duration of OFF is 1.35 seconds, respectively.

According to Table 1, when the BTS detects the service class of packet data being served every 60 ms and voice packet data is not detected during the time OFF, the second row indicates the probability to discriminate correctly the service class of packet data by only using the duplex activity factor ∝, and the third row indicates the probability by only using the frequency factor The thresholds value Δ2 and Δ3 assumed for the above test are 2 and 0.5 respectively.

TABLE 1

The estimation of the productivity of the present invention
(if voice packet data is not detected during the
duration of time OFF.)

| Web viewing time | 10 sec | 30 sec |
|---|---|---|
| Probability to discriminate correctly the service class if only using the duplex activity factor (α) is used | 0.846154 | 0.923077 |
| probability to discriminate correctly the service class if only the frequency factor (β) is used | 0.884615 | 0.961538 |

Table 2 also shows the result of the test under the same conditions as Table 1, but when voice packet data is detected during the duration of time OFF.

TABLE 2

The estimation of the productivity of the present invention
(if voice packet data is detected during the duration of
time OFF)

| Web viewing time | 10 sec | 30 sec |
|---|---|---|
| Probability to discriminate correctly the service class only using the duplex activity factor($\alpha$) | 1 | 1 |
| Probability to discriminate correctly the service class only using the frequency factor($\beta$) | 0.923077 | 0.961538 |

The accuracy of classifying the service classes of packet data being served using this invention is improved. Furthermore, through the use of various parameters, such as $\alpha$, $\beta$, $\Delta 1$, $\Delta 2$, $\Delta 3$, communication operators can operate their network efficiently by avoiding unnecessary delay of data transmission.

The above description of the preferred embodiment is provided to enable any person skilled in the art to make or use the present invention. Various modifications to the preferred embodiments will be readily apparent to those skilled in the art, and the generic principles defined herein may be applied to other embodiments. Thus, the present invention is not intended to be limited to the embodiment shown but is to be defined by the scope and spirit of the appended claims.

What is claimed is:

1. A method for classifying a service class for transmission of packet data in a two-way communication network which supports transmission of packet data having various quality of service (QoS), comprising the steps of:
   measuring a number of detected packet data;
   dividing a jitter value by the measured number of packet data;
   determining a parameter based on whether or not the divided value is larger than a threshold value associated with traffic characteristics of the packet data transmission;
   calculating a value by using the parameter; and
   using the calculated value to classify the service class of the packet data.

2. The method as recited in claim 1, wherein the steps of measuring and dividing are implemented over a forward link and a reverse link.

3. The method as recited in claim 1, wherein the determining step comprises:
   determining that the service class has a service for a predetermined period of time representing the packet data transmission occurs more than a predetermined number of times, if the divided value is smaller than the threshold value; and
   determining that the service class has a service for a predetermined period of time representing the packet data transmission does not occur more than the predetermined number of times, if the divided value is at least equal to the threshold value.

4. A method for classifying a service class for transmission of packet data in a two-way communication network which supports transmission of packet data having various quality of service (QoS), comprising the steps of:
   determining whether a first parameter associated with characteristics of the service class identifies a symmetric service corresponding real time data or not;
   determining whether a second parameter associated with a period of the service class identifies a service for a predetermined period of time representing the packet data transmission occurs more than a predetermined number of times or not;
   calculating a value using the first and second parameters; and
   using the calculated value to classify the service class of the packet data.

5. The method as recited in claim 4, wherein the step of determining whether the first parameter associated with the characteristics of the service class identifies the symmetric service corresponding to the real time data or not comprises the steps of:
   measuring a total number of packet data for a period of time associated with the classification of service classes; and
   determining that the first parameter identifies the symmetric service, when the measured number of packet data is larger than a threshold value associated with characteristics of the service class.

6. The method as recited in claim 5, wherein the measuring step is implemented over a forward link and a reverse link.

7. The method as recited in claim 4 wherein the step of determining whether the second parameter associated with the period of the service class identifies the service for the predetermined period of time representing the packet data transmission occurs more than the predetermined number of times or not comprises the steps of:
   measuring a number of detected packet data;
   dividing a jitter value by the measured number of packet data; and
   determining that the second parameter identifies the service for the predetermined period of time representing the packet data transmission occurs more than the predetermined number of times, when the divided value is larger than a threshold value associated with the period of the service class.

8. The method as recited in claim 7, wherein the steps of measuring and dividing are implemented over a forward link and a reverse link.

9. A service class classifying apparatus for transmission of packet data in a two-way communication network which supports transmission of packet data having various quality of service (QoS), comprising:
   a main processor for measuring a number of detected packet data, dividing a jitter value by the measured number of packet data, determining a parameter based on whether or not the divided value is larger than a threshold value associated with traffic characteristics of the packet data transmission, and calculating a value to classify the service class of the packet data by using the determined parameter; and
   a switch for determining paths of traffic.

10. The service class classifying apparatus as claimed in claim 9, wherein the main processor measures the total number of packet data that is transmitted over one of a forward link and a reverse link.

11. The service class classifying apparatus as claimed in claim 9 wherein the main processor determines whether the service class is a service for a predetermined period of time representing the packet data transmission occurs more than a predetermined number of times, if the divided value is smaller than the threshold value and determines that the service class is a service for a predetermined period of time representing the packet data transmission does not occur more than the predetermined number of times, if the divided value is at least equal to the threshold.

12. The service class classifying apparatus as claimed in claim 9 further comprising a gate way (GW) for supporting transfer of protocol between different networks.

13. A service class classifying apparatus for transmission of packet and dividing are implemented over a forward link and a reverse link. data in a two-way communication network which supports transmission of packet data having various quality of service (QoS), comprising:
 a main processor for determining whether a first parameter associated with characteristics of the service class is a symmetric service corresponding to real time data or not, for determining whether a second parameter associated with a period of the service class is a service for a predetermined period of time representing the packet data transmission occurs more than a predetermined number of times-or not, for calculating a value using the first and second parameters, and for using the calculated value to classify the service class of the packet data.

14. The service class classifying apparatus as claimed in claim 13 wherein the main processor further measures a total number of packet data for a period of time associated with the classification of service classes, and determines the first parameter based on whether the measured number of packet data is larger than a threshold value associated with characteristics of the service class.

15. The service class classifying apparatus as claimed in claim 13 wherein the main processor further measures the total number of packet data that is transmitted over one of a forward link and a reverse link.

16. The service class classifying apparatus as claimed in claim 13 wherein the main processor further measures a number of detected packet data, divides a jitter value by the measured number of packet data, and determines the second parameter based on whether or not the divided value is larger than a threshold value associated with the period of the service class.

17. The classifying service class apparatus as claimed in claim 13 wherein the main processor further measures the total number of packet data that is transmitted over one of over a forward link and a reverse link.

* * * * *